United States Patent Office 2,999,820
Patented Sept. 12, 1961

2,999,820
POLY-XYLYLENES PREPARED BY DECOMPOSITION OF QUATERNARY AMMONIUM COMPOUNDS
Thomas E. Young, Wilmington, Del., assignor to E. I. du Pont de Nemours and Company, Wilmington, Del., a corporation of Delaware
Filed May 2, 1955, Ser. No. 505,339
10 Claims. (Cl. 260—2)

This invention is concerned with a new polymerization process and with new polymers thereby obtained.

Polyarylenethylenes, i.e., polymers containing recurring units of the type have been prepared by pyrolysis of 1,4-dimethylarenes, e.g., p-xylene, at very high temperatures (M. Szwarc, Nature 160, 403 (1947); Faraday Soc. Discussions 2, 46 (1947); J. Chem. Phys. 16, 128 (1948); J. Pol. Sci. 6, 319 (1951); and British Patents 650,947 and 673,651). Polymers of this general type have also been prepared from p-xylylene dihalides (Jacobson, J. Am. Chem. Soc. 54, 1513 (1932)). Similar polymers have also been prepared by the dry pyrolysis of certain p-methylbenzyl quaternary ammonium hydroxides as is set forth in greater detail in copending application Serial No. 308,507, filed September 8, 1952, by Frank S. Fawcett, now U.S. Patent 2,757,146.

While the polyarylenethylenes are of great technical interest, all of those prepared having suitable mechanical properties have suffered from two practical shortcomings which have hindered commercial utilization. One is their high degree of crosslinking which results in limited tractability so that the polymers are difficult to fabricate into useful articles by conventional methods for fabricating thermoplastic polymers. The second limitation is their high rate of degradation at temperatures required for their thermal fabrication. The combination of these two shortcomings has been particularly unfortunate in that the limited tractability has required high fabricating temperatures which in turn result in degradation, so that the thermally fabricated products do not have high practical utility. For example, poly-p-xylylene prepared by pyrolysis of p-xylene by the method of Szwarc (British Patent 650,-947, March 7, 1951) can be softened at temperatures above 300° C. and forced through a spinnerette at very high pressure to yield a fiber, but, even in the few minutes required for this operation, degradation is so severe that flaws due to gas bubbles from degradation cause the fiber to break every few inches, and the bits of fiber so obtained are extremely brittle and useless for textile purposes. While films of use in packaging materials can be made from the polyarylenethylenes of the prior art they are not of the highest quality and are definitely capable of improvement.

This invention has as an object the preparation of polyarylenethylenes, including copolymers. A further object is the preparation of such polymers which are capable of being melt spun to form continuous orientable fibers. A further object is the provision of a process whereby the previous objects can be attained. Another object is the preparation of polymers having recurring methylene-aromatic-methylene units. Other objects will appear hereinafter.

These objects are accomplished by the present invention of the process whereby polymers having recurring units of the formula —CHR—Ar—CH$_2$—, wherein R is hydrogen or hydrocarbon and Ar is a divalent aromatic radical having the two valences thereof stemming from carbons of the same aromatic ring, said valences being separated by a chain of an even number, from 2 to 4, of ring atoms, said chain having one unit of aromatic unsaturation for each two ring atoms, are prepared by the reaction, at a temperature of at least 100° C., of an aqueous alkali metal hydroxide maintained at a hydroxide ion concentration of at least five molal with one or more quaternary ammonium compounds having the quaternary ammonium nitrogen joined to a methylene group in turn attached to carbon of a divalent aromatic ring having on carbon of said ring a hydrocarbon substituent having two hydrogens on the carbon attached to the ring, said substituent being separated from said methylene quaternary ammonium group by a chain of an even number, from 2 to 4, of ring atoms, said chain having one unit of aromatic unsaturation for each two ring atoms, said quaternary ammonium nitrogen being attached to three methyl groups and a hydroxide ion or the anion of a strong inorganic acid, preferably quaternary ammonium compounds of the formula in which G is —CZ$^3$=CZ$^4$, in which case Y and Z$^1$ are as shown below, or when taken together, may be a bivalent hydrocarbon radical, in which case one of P and Q is N and the other is CH,

—N=CZ$^5$
—N=N—
—N(hydrocarbon)—
—O—
or
—S—

X is —OH or an anion of a strong inorganic acid (i.e., an acid which in one-tenth normal aqueous solution has a pH less than 2).
Y is hydrogen, halogen or hydrocarbon.
The Z's may be hydrogen, halogen, alkyl, aralkyl, halogenoaralkyl or W;
W is an alkyl or aralkyl radical whose valence stems from a carbon atom attached to at least two hydrogen atoms and (W) is separated from the —CH$_2$N(CH$_3$)$_3$X group by an even numbered chain of two or four ring atoms (i.e., by a chain of one or two aromatic —C=M— units);
With the proviso that one Z is W.
M is carbon (in which case n=1) or nitrogen (in which case n=0).

The preferred monomers are those wherein the methylene quaternary ammonium group is on a carbocyclic ring.

The polymers produced by the process of this invention are made up of recurring units of the formula —CHR—Ar—CH$_2$—, i.e., polymers having bivalent aromatic, preferably carbocyclic, units separated by a bivalent hydrocarbon radical having two carbons in the polymer chain, i.e., by a vicinal bivalent hydrocarbon radical free from non-aromatic unsaturation. They are substantially represented by the formula in which R is hydrogen or hydrocarbon, Z is hydrogen, alkyl or aralkyl, G, Y, M and $n$ are as above and $m$ is a positive integer greater than 10.

When the novel reaction of this invention is applied to trimethyl(p-methylbenzyl)ammonium compounds (i.e., where $Z^1$ and Y are hydrogen, G is —CH=CH— and $Z^2$ is W, there is obtained a new class of poly-p-xylylenes characterized ($a$) by excellent resistance to thermal degradation as shown in the viscosity degradation test described below, and ($b$) by substantial freedom from crosslinking as shown by their enhanced tractability and their capacity for undergoing rapid solution as shown below.

*Viscosity degradation test.*—Poly-p-xylylene, 0.1 g., in a form fine enough to pass a 20-mesh screen, and 20 ml. of benzyl benzoate which is free of peroxides are mixed in the bulb of a viscometer. The viscometer is then quickly heated to 305° C. by immersing it in a vapor bath of refluxing benzophenone. At this temperature the mixture in the viscometer contains 0.39 g. of poly-p-xylylene per 100 cc. of benzyl benzoate. The mixture is agitated by a slow stream of nitrogen bubbles and the time required for complete solution of the polymer is determined visually by noting complete disappearance of the suspended polymer particles. The existence of a true solution is verified by checking the consistency of the subsequent viscosity measurements. (The presence of gel particles, for example, gives erratic viscosity readings.) As soon as a uniform solution is obtained, the inherent viscosity is determined, and the viscosity determination is repeated at five- to ten-minute intervals during a total of one to two hours of time elapsed from the initial heating of the viscometer. To observe the degradation rate as the slope of a straight line, the function $$\log \left( \frac{1}{M_m} - \frac{1}{M} \right)$$

where $M_m$ is the molecular weight of the monomer and $M$ is the molecular weight of the polymer at the time of testing, is plotted against time in minutes. The value of $M_m$ for poly-p-xylylene is 104.14. The value of $M$ is calculated from the inherent viscosity by means of the equation $$M = \left( \frac{\eta_{\text{inh.}}}{3.3 \times 10^{-4}} \right)^{4/3}$$

The specific rate constant ($k$) for the unimolecular thermal degradation of poly-p-xylylene is obtained from the slope of the $$\log \left( \frac{1}{M_m} - \frac{1}{M} \right)$$

vs. time curve by the relation $$k = \frac{-2.303}{t} \log \left( \frac{\frac{1}{M_m} - \frac{1}{M}}{\frac{1}{M_m} - \frac{1}{M_0}} \right)$$

where $t$ is the time in minutes, $M_0$ is the molecular weight of the polymer at zero time and the other symbols are as above. $M_0$ may be determined by extrapolation from the $$\log \left( \frac{1}{M_m} - \frac{1}{M} \right)$$

Figure 1:
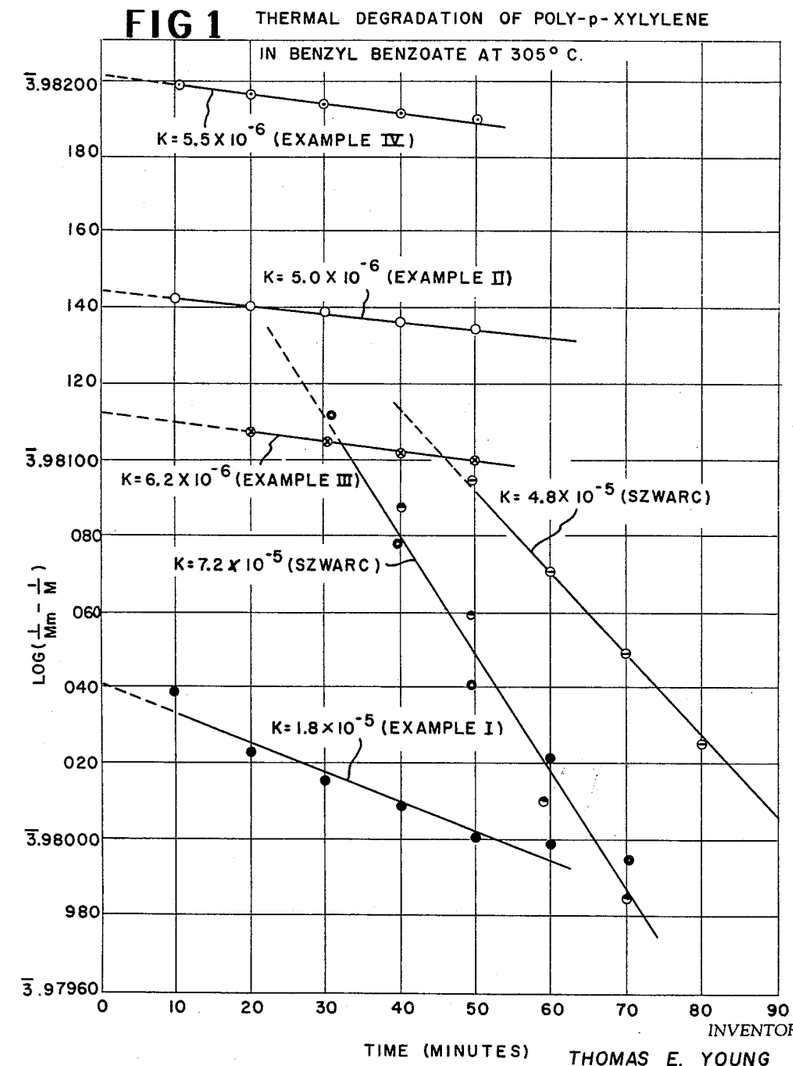

vs. time curve. With poly-p-xylylenes prepared by prior art methods the specific degradation rate ($k$) is always greater than $2.5 \times 10^{-5}$ min.$^{-1}$. With poly-p-xylylenes of this invention, the specific degradation rate is always less than $2.0 \times 10^{-5}$ min.$^{-1}$. This is illustrated by the chart of FIGURE 1, entitled "Thermal Degradation of Poly-p-xylylene in Benzyl Benzoate at 305° C."

This chart shows data on the poly-p-xylylenes of this invention and data on polymers prepared by vapor-phase pyrolysis of p-xylene according to the method of Szwarc, British Patent 650,947.

In the viscosity degradation test, the time elapsed from the initial heating of the viscometer to the earliest possible viscosity determination is a measure of the speed of solution. With the poly-p-xylylenes of the art, this time is always greater than 25 minutes. With the poly-p-xylylenes of this invention, this time is always less than 20 minutes and usually less than 10 minutes.

The poly-p-xylylenes of this invention readily undergo plasticized melt spinning through a spinnerette into air to yield continuous fibers which are readily handled and wound by known spinning methods, followed by cold or hot drawing to produce a highly oriented fiber.

The process of this invention also makes possible for the first time the preparation of a new class of copolymers in which 5–95% of the recurring units are

—CHR—A—CH$_2$— and 95–5% of the units are —CHR—B—CH$_2$—, in which R is hydrogen or hydrocarbon, A is a divalent aromatic radical hydrocarbon except for any hetero atom and halogen, with valences stemming from aromatic nuclear carbons which are attached to each other in the aromatic ring, and B is a divalent aromatic radical hydrocarbon except for any hetero atom and halogen, with valences stemming from aromatic carbons which are separated from each other in the aromatic ring by two nuclear atoms. These divalent aromatic rings include o- and p-phenylene, 1,2- and 1,4-naphthylene, 2,3- and 2,5-pyrollylene, 2,3-, 3,4-, and 2,5-pyridylene, 2,3- and 2,5-furylene, 2,3- and 2,5-thienylene, etc.

These copolymers may be represented, in terms of the formula previously shown for polymers of this invention as chains in which the recurring units are in which the ratio of the number of (D) units to the number of (E) units varies from 1:19 to 19:1, and the other symbols have the same meaning as previously indicated.

In a preferred embodiment of the present invention, a solution of one part of trimethyl(p-methylbenzyl) ammonium bromide in one part of water is added rapidly to a hot (130° C.) aqueous solution of sodium hydroxide. The concentrations of the two aqueous solutions are selected so that the weight of sodium hydroxide in the final mixture remains no less than 20% of the weight of the total water present during the polymerization reaction. Poly-p-xylylene begins to precipitate immediately, and the mixture is stirred at 110° C.–130° C. for three hours, during which time the polymer continues to form.

At the end of this time the powdery white polymer is separated by filtration, freed of adherent alkali and low molecular weight by-products by washing with water and extracting with ethanol. The polymer is dried in vacuo.

The following examples in which parts are by weight are illustrative of the invention.

EXAMPLE I

*Part A.—Preparation of trimethyl(p-methylbenzyl)-ammonium hydroxide*

A 3.5 x 72 cm. cylindrical column with a one-liter reservoir at the top is charged with 600 ml. of an anion exchange resin, e.g., "Amberlite" IRA–410. The resin is converted to the hydroxyl form by slowly washing with 2 liters of 4% aqueous sodium hydroxide solution, then washed with 6 liters of distilled water, after which the effluent is essentially neutral to litmus. A solution of 61 g. (0.25 mole) of trimethyl(p-methylbenzyl)ammonium bromide (Von Braun and Leistner, Ber. 59B, 2323–9 (1926)) in 700 ml. of water is passed through the resin bed. A neutral forerun of about 240 ml. is discarded. The strongly basic main effluent consists of 970 ml. (including afterwash) of an aqueous solution of the quarternary ammonium hydroxide. This solution is concentrated by distillation to a volume of 82 ml. The resulting solution contains 0.149 mole of trimethyl(p-methylbenzyl)ammonium hydroxide as determined by titration of an aliquot portion with standard hydrochloric acid.

*Part B.—Preparation of poly-p-xylylene from trimethyl-(p-methylbenzyl)ammonium hydroxide*

Eight hundred parts of sodium hydroxide is dissolved in 1200 parts of water in a glass reactor equipped with stirrer and condenser. The solution is heated to reflux and stirred vigorously while 460 parts of a 1.81 molar aqueous solution of trimethyl(p-methylbenzyl)ammonium hydroxide is added during five minutes. The mixture is stirred at reflux for two hours, and the resulting suspension of white solid is poured into 10,000 parts of water. The product is collected by filtration, washed thoroughly with water, then with ethanol, and finally with ether and air dried. The crude polymer is extracted with absolute ethanol for eight hours in a Soxhlet extractor, then oven dried in vacuo. The purified poly-p-xylylene weighs 22.3 parts and softens slightly without melting in the range 240° C.–300° C.; it dissolves readily in boiling benzyl benzoate and is reprecipitated on cooling to room temperature.

*Analysis.*—Calculated for $(C_8H_8)_n$: C, 92.26%; H, 7.74%. Found: C, 89.92%; H, 7.74%.

For other properties of this polymer see the table following Example IV.

EXAMPLE II

*Preparation of poly-p-xylylene from trimethyl(p-methylbenzyl)ammonium bromide*

A solution of 800 parts of sodium hydroxide in 1200 parts of distilled deaerated water is heated to reflux in a glass reactor equipped with a stirrer and condenser. The system is blanketed with nitrogen. A solution of 234 parts of trimethyl(p-methylbenzyl)ammonium bromide in 246 parts of water is added and the resulting mixture allowed to reflux for three and one-half hours, during which time poly-p-xylylene is formed as a suspended solid. The reaction mixture is poured into 10,000 parts of water and the suspended solid polymer collected by filtration. The polymer is washed with several portions of hot water, then extracted with two 200-part portions of boiling ethanol, and finally washed with ether and dried. The poly-p-xylylene so obtained is a white granular solid weighing 58.8 parts (58.8% yield). The material softens slightly without melting in the range 220° C.–260° C.

*Analysis.*—Calculated for $(C_8H_8)_n$: C, 92.26%; H, 7.74%. Found: C, 91.72%; H, 7.84%.

For other properties of this polymer see the table following Example IV.

EXAMPLE III

*Preparation of poly-p-xylylene from trimethyl(p-methylbenzyl)ammonium bromide in a two phase system*

A glass reactor fitted with a stirrer, condenser and thermometer extending below the expected liquid level is charged with 1000 parts of sodium hydroxide pellets and 1000 parts of water and the mixture stirred until a complete solution results. Five hundred parts of p-xylene are then added to the alkali solution and the mixture heated to reflux (temperature 110° C.). A solution of 234 parts of trimethyl(p-methylbenzyl)ammonium bromide in 200 parts of water is added during one minute and the mixture is stirred at reflux for three and one-half hours while the polymer forms as a suspended solid. The mixture is cooled and the polymer collected by filtration, washed with ethanol to remove the adherent p-xylene, then extracted with ethanol in a Soxhlet extractor for five hours. The poly-p-xylylene is obtained as a very fine white fluff (55.2 parts; 55.2% yield).

*Analysis.*—Calculated for $(C_8H_8)_n$: C, 92.26%; H, 7.74%. Found: C, 91.43%; H, 7.83%.

For other properties of this polymer see the table following Example IV.

EXAMPLE IV

*Preparation of poly-p-xylylene in the presence of an azo initiator*

A glass reactor is equipped with a stirrer, condenser, and addition funnel with a vapor by-pass. Nitrogen is swept slowly through the system via an inlet atop the addition funnel and exhausted from the condenser top. The reactor is charged with 100 parts of sodium hydroxide pellets followed by 100 parts of distilled water and the mixture stirred until complete solution results. One hundred parts of p-xylene is then added and the mixture heated to reflux (115° C.) A solution of 19.4 parts of trimethyl(p-methylbenzyl)ammonium chloride (prepared by the reaction of p-methylbenzyl chloride with trimethylamine) and 0.05 part of $\alpha,\alpha'$-azodiisobutyramidine hydrochloride in 10.6 parts of water is added during 80 seconds to the refluxing alkali. The mixture is refluxed for three and one-half hours, then cooled and the solid polymer collected by filtration. The crude polymer is purified by extraction with water, then with ethanol and finally dried. The yield of purified poly-p-xylylene is 8.29 parts (82%).

*Analysis.*—Calculated for $(C_8H_8)_n$: C, 92.26%; H, 7.83%. Found: C, 92.04%; H, 7.79%.

The poly-p-xylylenes prepared as shown in Examples I to IV are examined according to the procedure previously described for time of solution, inherent viscosity, and viscosity degradation rate constant. These values are shown in the following table along with comparative values for polymers prepared by vapor phase pyrolysis of p-xylene according to the method of Szwarc British Patent 650,947.

TABLE

| Poly-p-xylylene | Time of Solution (minutes) | Inherent Viscosity [1] After 50 minutes at 305° C. | Degradation Rate Constant,[1] $k(\text{min.}^{-1})$ |
|---|---|---|---|
| Example I | <10 | 0.55 | $1.8 \times 10^{-5}$ |
| Example II | <10 | 1.00 | $5.0 \times 10^{-6}$ |
| Example III | <20 | 0.81 | $6.2 \times 10^{-6}$ |
| Example IV | 4.8 | 1.78 | $5.5 \times 10^{-6}$ |
| Szwarc | 29.5 | 0.64 | $7.2 \times 10^{-5}$ |
| Szwarc | 39 | 0.78 | $4.8 \times 10^{-5}$ |

[1] Using 0.39 g. of polymer/100 ml. benzyl benzoate at 305° C.

EXAMPLE V

*Part A.—Preparation of trimethyl (o-methylbenzyl) ammonium bromide*

One hundred grams of o-xylylbromide is added dropwise to a solution of excess trimethylamine in 600 ml. of absolute ether at 0° C. Trimethyl(o-methylbenzyl) ammonium bromide forms slowly as a crystalline precipitate. After standing for two days the quaternary salt is isolated by filtration in a dry box and washed with ether. There is obtained 126 g. (94% theory), M.P. 200° C.–201° C. After recrystallization from acetonitrile, the melting point is 204° C.–205° C.

*Analysis.*—Calculated for $C_{11}H_{18}NBr$: N, 5.74%; Br (ionic), 32.73%. Found: N, 5.95%, 5.68%; Br (ionic), 32.36%, 32.15%.

*Part B.—Preparation of p-xylylene/o-xylylene 9/1 copolymer*

A glass reactor is charged with 100 parts of sodium hydroxide pellets and 100 parts of distilled water and the resulting solution heated to reflux. A solution of 21.1 parts of trimethyl(p-methylbenzyl)ammonium bromide and 2.34 parts of trimethyl(o-methylbenzyl)ammonium bromide in 20 parts of water is added rapidly. The mixture is refluxed for 3.5 hours (temperature 130° C.–135° C.), then cooled and the polymer collected by filtration. The small white granules are washed with water, then extracted with ethanol and dried in vacuo. There is obtained 8.11 parts (81.1%) of p-xylylene/o-xylylene copolymer which softens to a flowable melt in the range 170°–270° C.

*Analysis.*—Calculated for $(C_8H_8)_n$: C, 92.26%; H, 7.74%. Found: C, 92.08%; H, 7.78%.

This p-xylylene/o-xylylene copolymer forms tough, translucent films when pressed at 350° C./19,000 lbs./sq. in., then quenched. These films are highly crystalline and their infrared spectra show strong bands at $12.25\mu$ and $13.3\mu$ confirming the presence of both p- and o-disubstituted benzenes in the polymer chain.

EXAMPLE VI

*Preparation of p-xylylene/o-xylylene 4/1 copolymer*

A glass reactor is charged with 100 parts of sodium hydroxide pellets and 100 parts of distilled water and the resulting solution heated to reflux. A solution of 18.7 parts of trimethyl(p-methylbenzyl)ammonium bromide and 4.68 parts of trimethyl(o-methylbenzyl)ammonium bromide in 20 parts of water is added during one minute to the hot (125° C.) alkali solution. The mixture is refluxed for 3.5 hours (temperature 130° C.–135° C.), then cooled and the polymer collected by filtration. The finely divided white fluff is washed thoroughly with water, then extracted with ethanol and finally dried in vacuo. There is obtained 6.91 parts (69.1%) of p-xylylene/o-xylylene copolymer, M.P. 140° C.–225° C.

*Analysis.*—Calculated for $(C_8H_8)_n$: C, 92.26%; H, 7.74%. Found: C, 92.07%; H, 7.82%.

This polyxylylene copolymer forms tough, translucent films when pressed at 320° C./19,000 lbs./sq. in. These films are highly crystalline and their infrared spectra show strong bands at $12.25\mu$ and $13.3\mu$, respectively, indicative of para- and ortho-disubstituted benzene rings. The $13.3\mu$ band is relatively stronger than that of the polyxylylene of the previous example showing the greater proportion of ortho component in this example.

EXAMPLE VII

*Part A.—Preparation of trimethyl(3-chloro-4-methylbenzyl)-ammonium chloride*

A mixture of 100 g. of p-methyl-m-chlorobenzyl chloride (Stephen, Short and Gladding, J. Chem. Soc. 117, 510 (1920)) with excess trimethylamine in 500 ml. of anhydrous ether is permitted to stand for four days at room temperature. Filtration in a dry nitrogen atmosphere gives 98 g. (73% theory) of trimethyl(3-chloro-4-methylbenzyl)-ammonium chloride in the form of a very hygroscopic white powder, M.P. 198° C.–200° C. (decomp.).

*Analysis.*—Calculated for $C_{11}H_{17}NCl_2$: N, 5.98%; Cl (ionic), 15.14%. Found: N, 6.03%, 6.09%; Cl (ionic), 15.37%, 15.30%.

*Part B.—Preparation of poly-2-chloro-p-xylylene*

A solution of 169 parts of trimethyl(3-chloro-4-methylbenzyl)ammonium chloride in 200 parts of water is added to a stirred, refluxing solution of 1000 parts of sodium hydroxide in 1000 parts of water. The mixture is refluxed for three and one-half hours, then cooled to room temperature. A yellow supernatant oil phase separates and 1427 parts of ether is added. A white flocculent solid separates; it is collected by filtration and dried. There is obtained 5 parts of crude poly-2-chloro-p-xylylene.

Trimethyl(3 - fluoro - 4 methylbenzyl)ammonium fluoride is prepared as follows. o-Fluorotoluene is treated with formaldehyde (i.e., paraformaldehyde) and hydrogen chloride to obtain 3-fluoro-4-methylbenzyl chloride. This is treated with trimethylamine to yield trimethyl(3-fluoro-4-methylbenzyl)ammonium chloride which is passed in aqueous solution through an anion exchange resin bed in fluoride form to obtain trimethyl(3-fluoro-4-methylbenzyl)ammonium fluoride. When this is used in place of trimethyl(3-chloro-4-methylbenzyl)ammonium chloride in the process of this example, poly-2-fluoro-p-xylylene is obtained. Trimethyl(3-iodo-6-methylbenzyl) ammonium chloride is prepared as follows. p-Iodotoluene is treated with formaldehyde and hydrogen chloride to obtain 3-iodo-6-methylbenzyl chloride. This is treated with trimethylamine to obtain trimethyl(3-iodo-6-methylbenzyl)ammonium chloride. When this is used in the process of this example poly-3-iodo-o-xylylene is obtained.

EXAMPLE VIII

*Part A.—Preparation of trimethyl(benzylbenzyl) ammonium chloride*

A solution of 190 parts of benzylbenzyl chloride [Maquin and Gault, Compt. rend., 234, 629–31 (1952); the infrared data in Part B show that the process of this reference gives a mixture of o-benzylbenzyl chloride and p-benzylbenzyl chloride] in 1430 parts of diethyl ether is cooled to 0° C. An excess of anhydrous trimethylamine is passed in during a period of one hour and the solution is allowed to stand for four days. Trimethyl (benzylbenzyl)-ammonium chloride forms as a white precipitate which is collected by filtration, washed with ether and dried; weight 181 parts (75% yield); M.P. 70° C.–125° C. The broad melting range indicates a mixture of isomers, presumably ortho and para.

*Analysis.*—Calculated for $C_{17}H_{22}ClN$: C, 74.0%; H, 8.0%; Cl, 12.9%; N, 5.1%. Found: C, 70.97%; H, 8.20%; Cl, 13.71%; N, 5.02%.

*Part B.—Preparation of α-phenyl-o-xylylene/α-phenyl-p-xylylene copolymer*

A solution of 165 parts of trimethyl(benzylbenzyl)-ammonium chloride and 1 part of α,α'-azobisisobutyramidine hydrochloride in 250 parts of water is added to a solution of 1000 parts of sodium hydroxide in 1000 parts of water. The mixture is stirred and heated at 120° C.–125° C. for three hours. The polymer separates as a single coagulate which is ground to a powder, washed with water and ethanol, dissolved in 660 parts of benzene and reprecipitated by adding 7900 parts of ethanol. The purified polymer is extracted with ethanol, reduced to a fluff by high speed agitation in ethanol and dried. There is obtained 39.1 parts (36.2%) of α-phenyl-o-xylylene/α-phenyl-p-xylylene copolymer of M.P. 140° C.–190° C.

*Analysis.*—Calculated for $(C_{14}H_{12})_n$: C, 93.3%; H, 6.7%. Found: C, 92.92%; H, 6.79%; $\eta_{inh.} = 1.07 (0.5\%$ in benzene at 25° C.).

This copolymer forms a colorless, transparent film when molded at 170° C.–300° C. and 1000 lbs./sq. in. The film has physical properties as follows: tensile strength, 5,352 lbs./sq. in.; modulus (tension), 280,207 lbs./sq. in.; percent elongation, 2.9%; water absorption, 0–0.2%; density, 1.13. The infrared spectrum of the film shows a strong absorption band at $12.2\mu$ indicating para substitution and a strong band at $13.3\mu$ indicating ortho substitution.

EXAMPLE IX

*Preparation of poly-2,5-dimethylenefuran from trimethyl-(5-methyl-2-furfuryl)ammonium iodide*

A slurry of 299 parts of trimethyl(5-methyl-2-furfuryl)ammonium iodide [Eliel and Peckham, J. Am. Chem. Soc. 72, 1209 (1950)] and one part of $\alpha,\alpha'$-azodicyclohexanecarbonitrile in 300 parts of water is added during five minutes to a rapidly stirred, refluxing solution of 1000 parts of sodium hydroxide in 1000 parts of water. The mixture is allowed to reflux for four hours. Polymer forms in the aqueous medium and also in the reflux condenser. The combined polymer is separated by filtration, washed with hot water, then with boiling ethanol and dried. There is obtained 30.4 parts of solid poly-2,5-dimethylenefuran (30.4% yield).

EXAMPLE X

*Part A.—Preparation of trimethyl(5-methyl-2-furfuryl)ammonium hydroxide*

An anion exchange resin bed is prepared in the hydroxyl form as in Part A of Example I and washed with distilled water until the effluent is essentially neutral. A solution of 70 g. of trimethyl(5-methyl-2-furfuryl)ammonium iodide in 700 ml. of water is passed slowly over the resin bed. A neutral forerun, about 240 ml., is discarded. A main effluent comprising 650 ml. of aqueous, 0.229 molar, trimethyl(5-methyl-2-furfuryl)ammonium hydroxide is collected.

*Part B.—Preparation of poly-2,5-dimethylenefuran from trimethyl(5-methyl-2-furfuryl)ammonium hydroxide*

The solution obtained in Part A above is concentrated by distillation to 50 ml. and filtered. Eight grams of sodium hydroxide is dissolved in the filtrate. This solution is then heated at 100° C. for 1.5 hours. A deposit of white polymer is removed and the solution is heated an additional 1.5 hours, during which time another deposit of white polymer forms. The combined polymers are extracted for eight hours with water, then for four hours with methanol and dried. The yield of poly-2,5-dimethylenefuran is 2.4 g.; melting range 105° C.–200° C.

Trimethyl(5-ethyl-2-furfuryl)ammonium iodide is prepared as follows. $\alpha$-Ethylfuran is treated with formaldehyde and dimethylamine hydrochloride to obtain 5-ethyl-2-furfuryldimethylamine. This is treated with methyl iodide to obtain trimethyl(5-ethyl-2-furfuryl)ammonium iodide. When this is used in place of trimethyl(5-methyl-2-furfuryl)ammonium hydroxide in the process of this example, poly-2-ethylidene-5-methylenefuran is obtained. Similarly when trimethyl(5-benzyl-2-furfuryl)ammonium iodide is used, poly-2-benzylidene-5-methylenefuran is obtained.

EXAMPLE XI

*Part A.—Preparation of trimethyl(5-methyl-2-thenyl)ammonium hydroxide*

Smith and Cavallito, J. Am. Chem. Soc. 75, 3033 (1953) show the conversion of 2-thiophene carboxaldehyde to trimethyl(2-thenyl)ammonium iodide. By substituting 5-methyl-2-thiophene carboxaldehyde (Campaigne and Archer, J. Am. Chem. Soc. 75, 990 (1953)) for 2-thiophene carboxaldehyde in the process of Smith and Cavallito, trimethyl(5-methyl-2-thenyl)ammonium iodide is obtained.

An anion exchange resin bed in the hydroxyl form is prepared and washed until neutral as in Part A of Example I. A solution of 74 g. (0.25 mole) of trimethyl(5-methyl-2-thenyl)ammonium iodide in 700 ml. of water plus an after-wash of distilled water is passed slowly through the resin bed (flow rate not exceeding 30 ml./min.). A neutral forerun, 240 ml., is discarded. There is obtained a strongly alkaline main effluent comprising 860 ml. of an aqueous solution of trimethyl(5-methyl-2-thenyl)ammonium hydroxide. The concentration of the quaternary ammonium hydroxide is 0.1504 mole/liter as determined by titration with hydrochloric acid. Part of this solution is concentrated to 72 ml. (1.45 moles/liter) by distillation.

*Part B.—Preparation of poly-2,5-dimethylenethiophene from trimethyl(5-methyl-2-thenyl)ammonium hydroxide*

To 72 ml. of 1.45 molal aqueous trimethyl(5-methyl-2-thenyl)ammonium hydroxide there is added 8.0 g. of sodium hydroxide pellets. The resulting solution is heated at 100° C. for three hours. The white polymer which separates is extracted with water and ethanol and dried. There is obtained 0.37 g. of poly-2,5-dimethylenethiophene melting at 135° C.–155° C.

*Analysis.*—Calculated for $(C_6H_6S)_n$: C, 65.39%; H, 5.49%; S, 29.10%. Found: C, 65.48%; H, 5.61%; S, 29.30%.

Trimethyl(5-p-chlorobenzyl-2-thenyl)ammonium iodide is prepared as follows. p-Chlorobenzyl chloride and thiophene are mixed and heated in the presence of zinc chloride to obtain 2-(p-chlorobenzyl)thiophene. This is treated with N,N-dimethylformamide and phosphorus oxychloride to obtain 5-p-chlorobenzyl-2-thiophenecarboxaldehyde which is converted by the process of Smith and Cavallito cited above to trimethyl(5-p-chlorobenzyl-2-thenyl)ammonium iodide. When this is used in place of trimethyl(5-methyl-2-thenyl)ammonium hydroxide in Part B of Example XI, solid poly-2-p-chlorobenzylidene-5-methylenethiophene is obtained.

Trimethyl(4-bromo-5-methyl-2-thenyl)ammonium bromide is prepared as follows. 2,4-dibromo-5-methylthiophene (Steinkopf, Ann. 513, 281 (1934)) is treated with magnesium and methyl bromide in ether according to the method of Steinkopf and Jacob, Ann. 515, 273 (1935) to obtain 4-bromo-5-methyl-2-thienylmagnesium bromide. This is treated with formaldehyde to obtain 4-bromo-5-methyl-2-thenyl alcohol which is reacted with hydrogen bromide to obtain the corresponding bromide which when treated with trimethylamine yields trimethyl-(4-bromo-5-methyl-2-thenyl)ammonium bromide. When 2,3,4-tribromo-5-methylthiophene (Steinkopf, Ann. 513, 281 (1934)) is used as a starting material in place of 2,4-dibromo-5-methylthiophene in the steps above, the final product is trimethyl(3,4-dibromo-5-methyl-2-thenyl) ammonium bromide. When this is used in Part B of Example XI, poly-3-bromo-2,5-dimethylenethiophene is obtained. When trimethyl(3,4-dibromo-5-methyl-2-thenyl) ammonium bromide is used, poly-3,4-dibromo-2,5-dimethylenethiophene is obtained.

Trimethyl(3-methyl-2-thenyl)ammonium chloride is prepared as follows. 3-methyl-2-thenaldehyde is treated with sodium borohydride to obtain 3-methyl-2-hydroxymethyl-thiophene. This is treated with a benzene solution of thionyl chloride to obtain 3-methyl-2-chloromethylthiophene which on reaction with trimethylamine yields trimethyl(3-methyl-2-thenyl)ammonium chloride. When this is used in Part B of Example XI, poly-2,3-dimethylenethiophene is obtained.

EXAMPLE XII

*Part A.—Synthesis of 2,4-dimethylbenzyl chloride*

In a glass reactor a mixture of 418 parts of m-xylene, 117 parts of paraformaldehyde, 450 parts of glacial acetic acid, and 2090 parts of concentrated hydrochloric acid is heated at 60° C.–70° C. with stirring for seven hours. The mixture is then cooled to room temperature, let stand overnight and extracted with 715 parts of ether. The remaining reaction mixture is diluted with approximately 800 parts of water, saturated with sodium chloride and extracted a second time with 715 parts of ether. The combined ether extracts are washed with cold 5% sodium carbonate until free of acid and then dried over anhydrous potassium carbonate. After filtration the ether is removed by distillation and the residue distilled to give 535 parts (89% yield) of 2,4-dimethylbenzyl chloride, the major portion of which boils at 54° C.–56° C./0.2 mm. Fractionation of the product gives 420 parts (70% yield) of pure product boiling at 57° C.–58° C./1 mm. having a refractive index range of 1.5370 to 1.5373 at 25° C.

*Analysis.*—Calculated for $C_9H_{11}Cl$: C, 69.90%; H, 7.17%; Cl, 22.93%. Found: C, 70.25%; H, 7.46%; Cl, 20.17%.

*Part B.—Synthesis of trimethyl(2,4-dimethylbenzyl)-ammonium chloride*

To a solution of 420 parts of 2,4-dimethylbenzyl chloride, in 2015 parts of methyl ethyl ketone, trimethylamine, 350 parts, is added as a gas over a period of 45 minutes with cooling to maintain a reaction temperature of 20° C.–30° C. Stirring is continued at room temperature for seven hours. Trimethyl(2,4-dimethylbenzyl)ammonium chloride forms as a white crystalline product which is separated by filtration and weighs 560 parts (97% yield) after drying. It melts at 249° C.–250° C. on a Fisher melting point block.

*Analysis.*—Calculated for $C_{12}H_{20}NCl$: C, 67.42%; H, 9.43%; N, 6.55%; Cl, 16.59%. Found: C, 66.81%; H, 9.46%; N, 6.77%; Cl, 17.15%.

*Part C.—Synthesis of poly-o-methyl-p-xylylene*

Sodium hydroxide, 250 parts, is dissolved in 250 parts of distilled water under nitrogen. p-Xylene, 108 parts is then added and the mixture is heated to a vigorous reflux with rapid stirring. Trimethyl(2,4-dimethylbenzyl)ammonium chloride, 37.8 parts, dissolved in an equal quantity of water is added to the reaction mixture over a 2–3 minute period and vigorous stirring at reflux temperature is continued for 3.5 hours. The product which separates in the xylene layer on cooling the reaction mixture is added to a large excess of methanol with stirring. The rubbery mass which separates is washed with water and methanol until essentially free of alkali and then dried at 95° C. under reduced pressure. The dry poly-o-methyl-p-xylylene weighs 6 parts (32% yield) and is a tough, xylene-soluble solid softening at 85° C.–120° C. and having an inherent viscosity of 0.19 when measured at a concentration of 0.39% in benzyl benzoate at 305° C.

*Analysis.*—Calculated for $C_9H_{10}$: C, 91.48%; H, 8.53%. Found: C, 90.50%; H, 8.57%.

When 1-methyl-2-phenylbenzene (Gomberg and Pernert, J. Am. Chem. Soc. 48, 1372 (1926)) is used in place of m-xylene in Part A of this example, 4-methyl-3-phenylbenzyl chloride is obtained. This in turn gives trimethyl-(4-methyl-3-phenyl)benzylammonium chloride which is polymerized to obtain poly-o-phenyl-p-xylylene.

EXAMPLE XIII

*Part A.—Trimethyl(α-duryl)ammonium chloride*

A glass reactor is charged with 54 parts of α-chlorodurene (Smith and MacMullen, J. Am. Chem. Soc. 58, 633 (1936)) and 805 parts of methyl ethyl ketone. A chemical excess of anhydrous trimethylamine is passed into the solution over a period of four hours during a moderately exothermic reaction occurs and the quarternary ammonium salt crystallizes. The white solid product is collected by filtration, washed with cold methyl ethyl ketone and dried in a vacuum dessicator over phosphorus pentoxide for two days. The trimethyl(α-duryl)ammonium chloride weighs 62 parts (85% yield) M.P. 237.5° C.–241° C.

*Analysis.*—Calculated for $C_{13}H_{22}ClN$: C, 68.51%; H, 9.73%; Cl, 15.56%; N, 6.15%. Found: C, 67.85%; H, 9.39%; Cl, 15.23%; N, 6.16%.

*Part B.—Preparation of poly-2,5-dimethyl-p-xylylene*

A glass reactor is charged with 412 parts of sodium hydroxide pellets and 388 parts of water and the resulting solution heated to 130° C. A solution of 61.5 parts of trimethyl(α-duryl)ammonium chloride in 100 parts of water is added during 10 minutes and the resulting mixture allowed to reflux (136° C.) for 1.5 hours. The mixture is cooled and the white solid polymer collected by filtration, washed with several portions of hot water, then washed with ethanol and air dried. The poly-2,5-dimethyl-p-xylylene is extracted in a Soxhlet extractor with xylene for eight hours, then with ethanol for eight hours, and finally dried. The polydurylene weighs 20.0 parts (56% yield) and melts at 130° C.–215° C.

*Analysis.*—Calculated for $(C_{10}H_{12})_x$: C, 90.85%; H, 9.15%. Found: C, 89.97%; H, 9.00%; $\eta_{inh}$. (0.39 g./100 cc. in benzyl benzoate at 305° C.), 0.40.

EXAMPLE XIV

*Part A.—10-methyl-9-anthrylmethyltrimethylammonium iodide*

To a solution of 50 parts of 9-methylanthracene in 2100 parts of glacial acetic acid is added 50 parts of paraformaldehyde followed by 240 parts of 55% hydriodic acid. The mixture is stirred for five minutes and crystals of 10-methyl-9-iodomethylanthracene start to separate. Water (750 parts) is added and the mixture is cooled to 0° C. for 10 minutes. The crude iodomethyl compound is separated by filtration, washed with water and dissolved in 2640 parts of benzene. The golden yellow benzene solution is dried over anhydrous sodium sulfate and filtered. A chemical excess of anhydrous trimethylamine is passed into the solution in the course of 15 minutes. 10-methyl-9-anthrylmethyltrimethylammonium iodide separates in the form of yellow needles (55 parts, 54% yield). It is recrystallized from water to yield yellow needles which darken at 175° C. and melt at 250° C.–275° C.

*Analysis.*—Calculated for $C_{19}H_{22}IN$: C, 58.32%; H, 5.67%; N, 3.58%. Found: C, 58.08%; H, 5.67%; N, 3.59%.

*Part B.—Preparation of poly-9,10-dimethyleneanthracene*

The process of Example III is repeated using 10-methyl - 9 - anthrylmethyltrimethylammonium iodide in place of trimethyl(p-methylbenzyl)ammonium bromide. Poly-9,10-dimethyleneanthracene separates from the hot alkali mixture in the form of a bright yellow solid which is separated by filtration, washed with ethanol and dried.

In a similar manner 1-chloromethyl-4-methylnaphthalene is treated with trimethylamine to obtain 4-methyl-1 - naphthylmethyltrimethylammonium chloride, which when heated in concentrated aqueous alkali as in Example III yields poly-1,4-dimethylenenaphthalene as a solid polymer.

EXAMPLE XV

*Part A.—2-hydroxymethyl-4,5-dimethylthiazole*

A mixture of 500 parts of benzyloxythioacetamide, 400 parts of α-bromoethyl methyl ketone, 196 parts of pyridine and 790 parts of absolute ethanol is heated at reflux temperature and a mild exothermic reaction occurs. After this reaction has subsided heating at reflux is continued for 3½ hours. The solvent is evaporated under vacuum and a 10% chemical excess of 25% aqueous sodium hydroxide is added to the residue. This mixture is heated at reflux for four hours to form a homogeneous dark red solution. This solution is extracted exhaustively with ether. The ether extract is dried over anhydrous magnesium sulfate and distilled. There is obtained 245 parts of 2-hydroxymethyl-4,5-dimethylthiazole in the form of a pale yellow liquid, B.P. 79° C./10 mm., $n_D^{25}$ 1.5448.

*Analysis.*—Calculated for $C_9H_9NSO$: N, 9.78%; S, 22.40%. Found: N, 9.59%, 9.54%; S, 22.60%, 22.91%.

The picrate is recrystallized from alcohol, M.P. 113° C.–114° C.

*Analysis.*—Calculated for $C_{12}H_{12}N_4SO_8$: N, 15.05%. Found: N, 14.98%, 14.61%.

Part B.—4,5-dimethyl-2-thiazylmethyltrimethylammonium chloride

To a solution of 220 parts of 2-hydroxymethyl-4,5-dimethylthiazole in 352 parts of benzene there is slowly added a solution of 280 parts of thionyl chloride in 308 parts of benzene. The solution is heated at reflux for one hour and the solvents are then removed under vacuum. The residue is mixed thoroughly with water, neutralized with sodium bicarbonate and extracted with ether. The ether extract is dried over anhydrous magnesium sulfate and distilled. There is obtained 70 parts of 4,5-dimethyl-2-chloromethylthiazole boiling at 79° C.–80° C./7 mm. This is dissolved in anhydrous ether and the solution is saturated with dry trimethylamine. The resulting solution is allowed to stand several days, then is filtered under nitrogen to separate the salt which has crystallized. This salt is washed with ether and dried at 70° C. under vacuum to obtain 80 parts of 4,5-dimethyl-2-thiazylmethyltrimethylammonium chloride, M.P. 165° C.–170° C.

*Analysis.*—Calculated for $C_9H_{17}N_2SCl$: N, 12.69%; Cl (ionic), 16.06%. Found: N, 12.68%, 12.46%; Cl, (ionic), 16.40%.

Part C.—Preparation of poly-4-methyl-2,5-dimethylenethiazole

The process of Example III is repeated using 4,5-dimethyl-2-thiazylmethyltrimethylammonium chloride in place of trimethyl(p-methylbenzyl)ammonium bromide. Poly-4-methyl-2,5-dimethylenethiazole separates from the hot alkali mixture in the form of a solid polymer, which is separated by filtration, washed with ethanol and dried.

EXAMPLE XVI 2,5-lutidine (2,5-dimethylpyridine) is carefully chlorinated using only enough chlorine to replace a single equivalent of hydrogen with chlorine to obtain 2-chloromethyl-5-methylpyridine. This is added in small portions to a solution of excess trimethylamine in diethyl ether, and (4-methyl-2-pyridylmethyl)trimethylammonium chloride slowly precipitates. This precipitate is separated and heated at 110° C. in 50% aqueous sodium hydroxide to obtain poly-2,5-dimethylenepyridine as a white solid.

In a similar process 1,5-dimethyl-2-pyrrolylmethyl chloride is treated with trimethylamine and the resulting quaternary ammonium chloride is treated with hot 50% aqueous sodium hydroxide to obtain poly-2,5-dimethylene-N-methylpyrrole.

N-heterocyclic quaternary ammonium compounds suitable as intermediate for the process of the present invention can be prepared from the corresponding dialkyl-N-heterocyclic compounds as follows.

2,5-dimethylpyridine (Bratton and Bailey, J. Am. Chem. Soc. 59, 175 (1937)) is treated with bromine in hydrochloric acid to obtain 2-methyl-5-bromomethylpyridine. This compound is treated with trimethylamine to obtain trimethyl(2-methyl-5-pyridyl)methylammonium bromide which when treated with hot concentrated alkali as in Example III yields poly-2,5-dimethylenepyridine.

In a similar way 2,5-dimethylpyrazine (Gabriel and Pinkus, Ber. 26, 2206 (1893)) and 3,6-dimethylpyridazine (Bacchetti, Gazz. chim. ital., 80, 783 (1950)) are chlorinated in hydrochloric acid and treated with trimethylamine to obtain trimethyl(5-methyl-2-pyrazinyl)methylammonium chloride and trimethyl(6-methyl-3-pyridazinyl)methylammonium chloride which on heating in concentrated alkali as in Example III yield, respectively, poly-2,5-dimethylenepyrazine and poly-3,6-dimethylenepyridazine.

Poly-2,5-dimethylenepyrimidine is similarly prepared from 2,5-dimethylpyrimidine which is prepared by condensing diethyl α-methylmalonate with acetamidine and converting the resulting 2,5-dimethyl-4,6-dihydroxypyrimidine to 2,5-dimethyl-4,6-dichloropyrimidine by the action of phosphorus pentachloride followed by removal of the two chlorine atoms by reduction in the presence of nickel.

Similarly 5,8-dimethylquinoline is brominated in hydrochloric acid and treated with trimethylamine to yield trimethyl(8-methyl-5-quinolyl)methylammonium bromide which is treated in boiling 50% aqueous caustic to obtain poly-5,8-dimethylenequinoline. In a similar manner poly-5,8-dimethyleneisoquinoline is obtained.

N-bromosuccinimide is also a useful halogenating agent for preparing intermediates for the process of this invention. For example, 2,5-dimethyl-N-phenylpyrrole (Knorr, Ann 236, 305 (1886)) is treated with N-bromosuccinimide to obtain 2-bromomethyl-5-methyl-N-phenylpyrrole. This is treated with trimethylamine to obtain trimethyl(5-methyl-N-phenyl-2-pyrrolyl)methylammonium bromide which when heated in concentrated aqueous caustic as in Example III yields poly-2,5-dimethylene-N-phenylpyrrole.

As shown in Examples V, VI, and VIII, the process of the present invention is adaptable for use with mixtures of the operable quaternary ammonium compounds to produce the corresponding copolymers. Thus, by treating together the mixed trimethyl(benzylbenzyl)ammonium chloride isomers of Example VIII and the trimethyl-(5-methyl-2-furfuryl)ammonium iodide of Example IX in hot concentrated sodium hydroxide solution, a three-component α-phenyl-o-xylylene/α-phenyl-p-xylylene/2,5-dimethylenefuran copolymer is obtained. A mixture of trimethyl(p-methylbenzyl)ammonium chloride and trimethyl(α-duryl)ammonium chloride treated in hot concentrated sodium hydroxide yield p-xylylene/2,5-dimethyl-p-xylylene copolymer. Melt spinning of this copolymer at 280°–300° C. yields fibers with tenacities in the range of 0.5–0.6 gram per denier.

By similar treatment in hot aqueous alkali, trimethyl(4-bromo-5-methyl-2-thenyl)ammonium bromide and trimethyl(3-methyl-2-thenyl)ammonium chloride yield 3-bromo-2,5-dimethylenethiophene/2,3-dimethylenethiophene copolymer; trimethyl(5-benzyl-2-furfuryl)ammonium iodide (prepared by treating furylphenylmethane with dimethylamine hydrochloride and formaldehyde to obtain (5-benzyl-2-furfuryl)-dimethylamine) which on reaction with methyl iodide yields trimethyl(5-benzyl-2-furfuryl)ammonium iodide and trimethyl-(3-methyl-2-thenyl)ammonium chloride yield 2-benzylidene-5-methylenefuran/2,3-dimethylenethiophene copolymer; trimethyl(5-methyl-2-furfuryl)ammonium iodide and trimethyl(o-benzylbenzyl)ammonium chloride yield 2,5-dimethylenefuran/α-phenyl-o-xylylene copolymer; and trimethyl(3-chloro-4-methylbenzyl)ammonium chloride and trimethyl(o-methylbenzyl)ammonium bromide yield 2-chloro-p-xylylene/o-xylylene copolymer.

In the quaternary compounds employed in the present invention, the anion associated with the quaternary nitrogen is preferably hydroxyl or the anion of a strong inorganic acid. Thus, trimethyl(p-methylbenzyl)ammonium hydroxide is treated with aqueous HF, and the resulting trimethyl(p-methylbenzyl)-ammonium fluoride is employed in the process of Example II to prepare poly-p-xylylene. By means of an anion exchange column prepared in the sulfate form, an aqueous solution of trimethyl(3-chloro-4-methylbenzyl)ammonium chloride is converted to trimethyl(3-chloro-4-methylbenzyl)ammonium sulfate which in turn yields poly-2-chloro-p-xylylene when treated by the process of Part B of Example VII. The corresponding phosphate intermediate is similarly prepared by means of an anion exchange resin in phosphate form, and this intermediate is converted to poly-2-chloro-p-xylylene by the action of hot concentrated aqueous alkali.

The composition of the quaternary ammonium compounds may be varied within the formula indicated above. However, the presence of the quaternary nitrogen is essential for the operation of the process of this invention. Thus, when p-methylbenzyl bromide is substituted for trimethyl(p-methylbenzyl)ammonium bromide in Example III, no polymer is obtained. Under similar conditions, phenyl-p-tolyl chloromethane likewise fails to yield a polymer.

The relative positions occupied by the R—CH₂— group and the —CH₂—N(CH₃)₃X groups are also critical. Thus, when trimethyl(m-methylbenzyl)ammonium bromide is employed in the process of Example III, no polymer is obtained.

As the polymerization medium in the present invention, there may be employed aqueous solutions of the hydroxides of the alkali metals, the minimum maintained concentration of the hydroxide ion being five molal. With solutions more dilute than five molal in hydroxide ion, the yield of polymer becomes negligible. Thus, concentrated solutions of lithium hydroxide, sodium hydroxide, potassium hydroxide, rubidium hydroxide, and cesium hydroxide may be used interchangeably in the process of the invention.

For reasons not fully understood, highest polymer yields and maximum polymer viscosities are achieved by carrying out the polymerization reaction in the presence of a separate liquid non-aqueous phase. This can be removed from the precipitated polymer by extraction, evaporation, etc. This is preferably a liquid aromatic hydrocarbon or halogenated aromatic hydrocarbon boiling above 100° C. For example, toluene, p-fluorotoluene, xylene, ethylbenzene, cumene, mesitylene, chlorobenzene, bromobenzene, iodobenzene, tetrahydronaphthalene, and the like may be employed.

A temperature of 100° C. represents a practical minimum for carrying out the process of this invention since the rate of polymer formation rapidly becomes negligible at temperatures progressively lower than 100° C., no polymer at all being obtained from trimethyl(p-methylbenzyl)ammonium hydroxide in strong aqueous sodium hydroxide at 75° C. For reasons of economy, it is preferred to carry out the process of this invention at atmospheric pressure. When this is done, the upper temperature limit is the boiling temperature of the reaction mixture. The boiling temperatures of concentrated aqueous alkali solutions lie substantially above 100° C. While the process can be operated at pressures above atmospheric, e.g., 5–10 atmospheres, there is little reason for so doing as the advantages realized thereby are not such as to justify the additional apparatus complications involved.

The present invention has a number of distinct advantages over the known processes for producing polyaryleneethylenes and other polymers with recurring bivalent aromatic radicals separated by ethylene radicals. It is particularly economical in that it may be carried out at atmospheric pressure, and that only moderately elevated temperatures are required. The ability to operate in an aqueous system represents a very practical advance over the art. The quaternary ammonium compounds employed as starting materials in the present invention are extremely hygroscopic, and substantial expense is eliminated in the present process as compared with prior art processes, since in the present process it is not necessary to isolate the starting material in anhydrous form.

A further distinct advantage of the present invention is that when it is employed with those quarternary ammonium compounds which yield poly-p-xylylene, the physical properties, particularly the unexpected combination of high viscosity and improved solubility, of the poly-p-xylylene obtained and its adaptability to fabricating methods applicable to thermoplastic polymers are of a different order from those of the known poly-p-xylylenes. The unexpected combination of high viscosity with improved solubility may be due to greater linearity, with minimum crosslinking, of the present poly-p-xylyienes. These structural features may also be the underlying reason for the remarkable adaptability of these poly-p-xylylenes to fabrication by thermal methods. The polymers and copolymers of this invention are of use in the preparation of fibers, particularly by the technique of plasticized melt-spinning as is illustrated by the following:

A mixture of seven parts of poly-p-xylylene prepared as in Example I with three parts of benzyl benzoate is heated at 330° C.–350° C. and forced through a spinnerette into air. The resulting fiber is collected by winding on a conventional windup apparatus. Traces of benzyl benzoate are removed by extraction with alcohol. The strength of the fiber is improved in a sintering operation by passing the fiber over a metal pin (½ inch diameter) heated at 350° C. The strength of the fiber is then further improved by drawing at elevated temperatures.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Substantially linear p-xylene homopolymer, the recurring units of which are units, said homopolymer having a specific unimolecular thermal degradation constant, $k$, of less than $2.0 \times 10^{-5}$ min.$^{-1}$, said constant being determined at 305° C. in solution in benzyl benzoate at a concentration of 0.39 gm. of polymer in 100 ml. of benzyl benzoate, said $k$ being that of the equation $$k = \frac{-2.303}{t} \log \left( \frac{\frac{1}{M_m} - \frac{1}{M}}{\frac{1}{M_m} - \frac{1}{M_0}} \right)$$

wherein $t$ is the heating time in minutes at 305° C., $M_m$ is the molecular weight of the p-xylylene unit, i.e., 104.14, $M$ is the molecular weight of said polymer determined from the inherent viscosity of said solution at time $t$ by the equation $$M = \left( \frac{\eta_{inh.}}{3.3 \times 10^{-4}} \right)^{4/3}$$

and $M_0$ is the molecular weight of said polymer at time 0, the time elapsed in the viscosity degradation test from the initial heating of the viscometer to the earliest possible viscosity determination being less than twenty minutes, said homopolymer having an inherent viscosity of at least 0.55 after 50 minutes at 305° C. in solution in benzyl benzoate at a concentration of 0.39 g. of polymer in 100 ml. of benzyl benzoate, said homopolymer being prepared by heating to a temperature of at least 100° C. in an aqueous alkali metal hydroxide solution, maintained at at least 5 molal concentration, a member of the class consisting of quaternary ammonium hydroxides and quaternary ammonium salts of strong inorganic acids in which the quaternary ammonium nitrogen is attached to three methyl groups and to a methylene radical whose remaining valence is satisfied by carbon of a phenyl ring, said phenyl ring having in its p-position a methyl substituent.

2. A substantially linear, crystalline copolymer consisting essentially of 5 to 95% —CHR—A—CH₂— units and 95 to 5% —CHR—B—CH₂— units wherein R is a member of the class consisting of hydrogen and monovalent hydrocarbon radicals and A and B are divalent aromatic radicals with the valences stemming from aromatic carbons of the same aromatic ring, the two valances of radical A stemming from adjacent nuclear carbons and the two valences of radical B being on nuclear carbons separated by two aromatic nuclear atoms.

3. A substantially linear, crystalline copolymer consisting essentially of recurring —$CH_2C_6H_4CH_2$— units in from 5 to 95% of which units the phenylene radical is o-phenylene and in which the remaining phenylene radicals are p-phenylene radicals.

4. A process for the preparation of polymers having recurrent —CHR—Ar—$CH_2$— units wherein R is a member of the class consisting of hydrogen and monovalent hydrocarbon radicals and Ar is a bivalent unit wherein the two valences stem from carbons of an aromatic ring and are separated by an even number, from two to four, of annular aromatic ring atoms which comprises heating, to a temperature of at least 100° C. in an aqueous alkali metal hydroxide solution, maintained at at least 5 molal concentration, a member of the class consisting of quaternary ammonium hydroxides and quaternary ammonium salts of strong inorganic acids in which the quarternary ammonium nitrogen is attached to three methyl groups and to a methylene radical whose remaining valence is satisfied by carbon of an aromatic ring, said aromtic ring having on carbon thereof a hydrocarbon substituent separated by an even number, from two to four, of aromatic ring atoms from said methylene radical and having at least two hydrogens on the carbon of said hydrocarbon substituent linked to aromatic ring carbon.

5. Process for the preparation of polymers having recurrent —CHR—Ar—$CH_2$— units wherein R is a member of the class consisting of hydrogen and monovalent hydrocarbon radicals and Ar is a bivalent unit wherein the two valences stem from carbons of an aromatic ring and are separated by an even number, from two to four, of annular aromatic ring atoms which comprises heating, to a temperature of at least 100° C. in an aqueous alkali metal hydroxide solution, maintained at at least 5 molal concentration, at least one member of the class consisting of quaternary ammonium hydroxides and quaternary ammonium salts of strong inorganic acids in which the quaternary ammonium nitrogen is attached to three methyl groups and to a methylene radical whose remaining valence is satisfied by carbon of an aromatic ring, said aromatic ring having on carbon thereof a hydrocarbon substituent separated by an even number, from two to four, of aromatic ring atoms from said methylene radical and having at least two hydrogens on the carbon of said hydrocarbon substituent linked to aromatic ring carbon.

6. Process according to claim 5 wherein there is present with the aqueous alkali metal hydroxide a second liquid non-aqueous phase.

7. Process according to claim 5 wherein the non-aqueous phase is a liquid, boiling above 100° C. and selected from the class consisting of aromatic hydrocarbons and halogenated aromatic hydrocarbons.

8. Process of claim 5 wherein a free radical initiator is used.

9. A process for the preparation of polymers having recurrent —CHR—CR—$CH_2$— units wherein R is a member of the class consisting of hydrogen and monovalent hydrocarbon radicals and Ar is a bivalent unit wherein the two valences stem from carbons of an aromatic ring and are separated by an even number, from two to four, of annular aromatic ring atoms which comprises heating, to a temperature of at least 100° C. in an aqueous alkali metal hydroxide solution, maintained at at least 5 molal concentration, at least two members of the class consisting of quaternary ammonium hydroxide and quaternary ammonium salts of strong inorganic acids in which the quaternary ammonium nitrogen is attached to three methyl groups and to a methylene radical whose remaining valence is satisfied by carbon of an aromatic ring, said aromatic ring having on carbon thereof a hydrocarbon substituent separated by an even number, from two to four, of aromatic ring atoms from said methylene radical and having at least two hydrogens on the carbon of said hydrocarbon substituent linked to aromatic ring carbon.

10. A process for the preparation of polymers having recurrent —CHR—AR—$CH_2$— units wherein R is a member of the class consisting of hydrogen and monovalent hydrocarbon radicals and Ar is a bivalent unit wherein the two valences stem from carbons of an aromatic ring and are separated by an even number, from two to four, of annular aromatic ring atoms which comprises heating, to a temperature of at least 100° C. in an aqueous alkali metal hydroxide solution, maintained at at least 5 molal concentration, at least two members of the class consisting of quaternary ammonium hydroxides and quaternary ammonium salts of strong inorganic acids in which the quaternary ammonium nitrogen is attached to three methyl groups and to a methylene radical whose remaining valence is satisfied by carbon of an aromatic ring, said aromatic ring having on carbon thereof a hydrocarbon substituent separated by an even number, from two to four, of aromatic ring atoms from said methylene radical and having at least two hydrogens on the carbon of said hydrocarbon substituent linked to aromatic ring carbon, one of said members having said hydrocarbon substituent separated from said methylene radical by two ring atoms and another of said members having said hydrocarbon substituent separated from said methylene radical by four ring atoms.

References Cited in the file of this patent

UNITED STATES PATENTS

| | | |
|---|---|---|
| 2,712,532 | Szwarc | July 5, 1955 |
| 2,757,146 | Fawcett | July 31, 1956 |

OTHER REFERENCES

Brown et al.: J. Chem. Soc. (October 1953), pp. 3270 to 3277.

UNITED STATES PATENT OFFICE

CERTIFICATE OF CORRECTION

Patent No. 2,999,820                            September 12, 1961

Thomas E. Young

It is hereby certified that error appears in the above numbered patent requiring correction and that the said Letters Patent should read as corrected below.

Column 2, line 43, for "-N=CZ$^5$" read ---N=CZ$^5$- --; column 13, line 26, for "12,69%" read -- 12.69% --; column 18, line 4, for "-CHR-CR-CH$_2$-" read ---CHR-Ar-CH$_2$- --; line 24, for "-CHR-AR-CH$_2$-" read -- -CHR-Ar-CH$_2$- --.

Signed and sealed this 17th day of April 1962.

(SEAL)
Attest:

ESTON G. JOHNSON                                    DAVID L. LADD Attesting Officer                                         Commissioner of Patents